(12) United States Patent
Lindstrom (10) Patent No.: US 12,447,068 B1
(45) Date of Patent: Oct. 21, 2025

(54) VAGINAL DISCHARGE COLLECTION DEVICE, METHOD OF USING THE SAME, AND PACKAGING ASSEMBLY THEREOF

(71) Applicant: Holly D. Lindstrom, Sterling, VA (US)

(72) Inventor: Holly D. Lindstrom, Sterling, VA (US)

( * ) Notice: Subject to any disclaimer, the term of this patent is extended or adjusted under 35 U.S.C. 154(b) by 0 days.

(21) Appl. No.: 19/265,869

(22) Filed: Jul. 10, 2025

(51) Int. Cl.
*A61F 13/472* (2006.01)
*A61F 13/475* (2006.01)
*A61F 13/551* (2006.01)
*A61F 13/47* (2006.01)

(52) U.S. Cl.
CPC ...... *A61F 13/47245* (2013.01); *A61F 13/475* (2013.01); *A61F 13/55145* (2013.01); *A61F 2013/4706* (2013.01)

(58) Field of Classification Search
CPC .......... A61F 13/47209; A61F 13/47227; A61F 13/47245; A61F 13/475; A61F 13/55145; A61F 13/5516; A61F 13/55165; A61F 2013/1513; A61F 2013/4706
See application file for complete search history.

(56) References Cited

U.S. PATENT DOCUMENTS

| | | |
|---|---|---|
| 3,726,277 A | 4/1973 | Hirschman |
| 5,171,302 A | 12/1992 | Buell |
| 5,197,959 A | 3/1993 | Buell |
| 5,520,675 A * | 5/1996 | Knox-Sigh ....... A61F 13/47227 604/387 |
| 5,672,165 A * | 9/1997 | Belecky ............ A61F 13/47209 604/383 |
| 6,319,238 B1 * | 11/2001 | Sartorio ............ A61F 13/47209 604/385.17 |
| 7,530,973 B2 | 5/2009 | Tanio |
| 8,074,801 B2 * | 12/2011 | Slayton .................. B65D 75/42 206/440 |
| 9,757,281 B2 | 9/2017 | Goldsmith |
| 10,058,306 B2 | 8/2018 | Fleming |
| 2007/0093738 A1 * | 4/2007 | Krecker .................. A61F 13/47 602/61 |
| 2012/0059344 A1 | 3/2012 | Seo |

FOREIGN PATENT DOCUMENTS

| | | | |
|---|---|---|---|
| AU | 2019101495 A4 | 1/2020 | |
| CA | 2491354 A1 * | 6/2006 | ......... A61F 13/4758 |
| DE | 4032119 A1 | 4/1992 | |

(Continued)

*Primary Examiner* — Catharine L Anderson
*Assistant Examiner* — Lynne Anderson
(74) *Attorney, Agent, or Firm* — Boone IP Law, PLLC (57) ABSTRACT

A vaginal discharge collection device includes a main body including an absorbent material and which is tapered from a front end to a rear end, a first vertical cross section of the front end being larger than a second vertical cross section of the rear end. The device further includes an external liquid barrier including a liquid-impermeable material, the external liquid barrier including a bottom liquid barrier and first and second lateral liquid barriers, the bottom liquid barrier extending to the rear end across the bottom surface of the main body, and the first and second lateral liquid barriers extending to the rear end across at least respective portions of the first and second lateral surfaces of the main body. The device further includes an internal liquid barrier extending through the main body.

19 Claims, 4 Drawing Sheets

(56) References Cited

FOREIGN PATENT DOCUMENTS

| | | | |
|---|---|---|---|
| EP | 1063953 B1 | 1/2007 | |
| GB | 1560736 A | 2/1980 | |
| GB | 2351023 A * | 12/2000 | ....... A61F 13/47209 |
| GB | 2485143 A1 | 5/2012 | |
| JP | 4429391 B2 | 3/2010 | |
| KR | 101676844 B1 | 11/2016 | |
| WO | 02062277 A1 | 8/2002 | |

* cited by examiner

VAGINAL DISCHARGE COLLECTION DEVICE, METHOD OF USING THE SAME, AND PACKAGING ASSEMBLY THEREOF

TECHNICAL FIELD

The present disclosure relates to a vaginal discharge collection device, e.g., for collecting menstrual fluid or other vaginal discharge, a method of using the same, and a packaging assembly thereof.

BACKGROUND

Some users regularly experience vaginal discharge. For example, a menstrual cycle typically includes the shedding of the uterine lining, resulting in menstrual bleeding. Throughout the cycle, it is also normal to experience varying amounts and types of vaginal discharge, which helps the body to cleanse the vagina and maintain a healthy environment. Other vaginal discharge may include, e.g., male ejaculate following intercourse. Additionally, when using a vaginal suppository, especially at night, it is common to notice an increase in discharge. This happens because the suppository, which is often in solid form, melts upon insertion due to body heat, releasing its active ingredients, and partially exiting the body.

Vaginal discharge, while typically a normal and healthy bodily function, can be uncomfortable for users both during the day and at night, which may create a persistent feeling of dampness and/or cause irritation. During the day, discharge can cause chafing or discomfort when walking, sitting or performing other activities. At night, it can lead to interrupted sleep from a sensation of wetness. If not adequately absorbed or managed, discharge can also soil underwear or clothing, potentially leading to stains, odors, and the need for frequent changes or washing, which may cause inconvenience to a user.

Conventional hygiene products, such as sanitary pads, tampons, menstrual cups, and period underwear, are designed to manage and provide protection from menstrual flow or other vaginal discharge. While these products can be highly effective for many situations, they are sometimes insufficient-particularly when someone is lying on their back, or in other situations in which the vaginal opening is more elevated than the anus (e.g., when sitting, climbing, etc.). In these positions, vaginal discharge can flow backward, e.g., due to gravity, potentially bypassing the absorbent areas of a pad or leaking around the edges of a cup or tampon. This can result in leaks and discomfort.

SUMMARY

A vaginal discharge collection device is disclosed. The vaginal discharge collection device includes a main body including an absorbent material, and which is tapered from a front end to a rear end, a first vertical cross section of the front end being larger than a second vertical cross section of the rear end, the main body including first and second lateral surfaces, and a bottom surface between the first and second lateral surfaces. The vaginal discharge collection device further includes an external liquid barrier including a liquid-impermeable material, the external liquid barrier including a bottom liquid barrier and first and second lateral liquid barriers, the bottom liquid barrier extending to the rear end across the bottom surface of the main body, and the first and second lateral liquid barriers extending to the rear end across at least respective portions of the first and second lateral surfaces of the main body. The vaginal discharge collection device further includes an internal liquid barrier extending through the main body.

BRIEF DESCRIPTION OF THE DRAWINGS

Other features and advantages disclosed herein will become more apparent from the following detailed description of exemplary embodiments when read in conjunction with the attached drawings.

DETAILED DESCRIPTION

FIGS. 1-4 show exemplary embodiments of a vaginal discharge collection device 100.

In exemplary embodiments, the vaginal discharge collection device 100 comprises a main body 110 having a front end 112 and a rear end 114. The main body 110 also includes first and second lateral surfaces 125, 126, and a bottom surface 121 between the first and second lateral surfaces 125, 126. The main body 110 includes an absorbent material. Examples of absorbent materials may include, but are not limited to, natural fibers (e.g., cellulose fiber) or synthetic superabsorbents.

Figure 1:
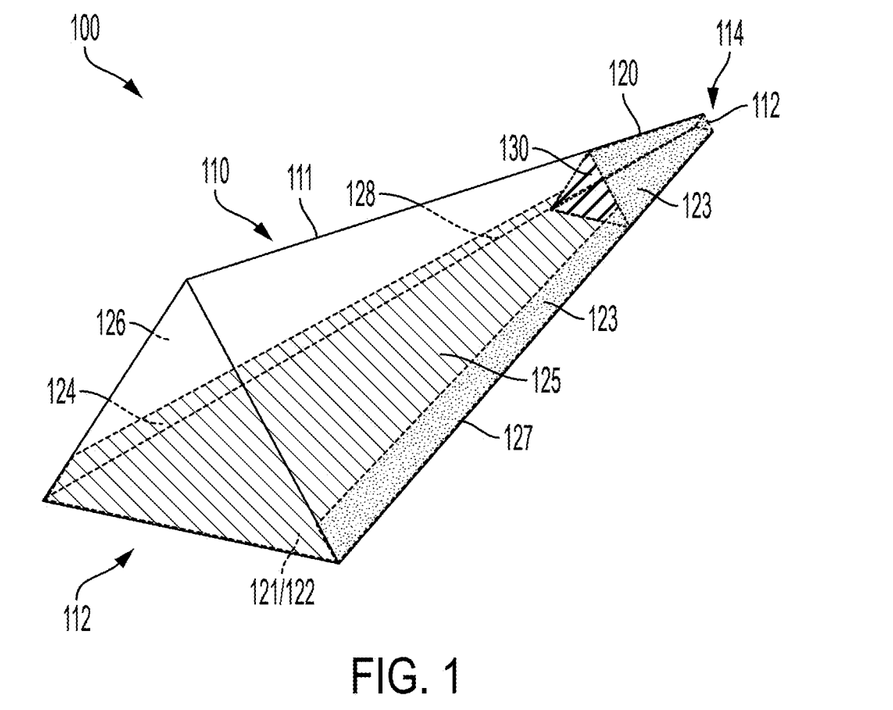
FIG. 1 is a partially transparent schematic perspective view of an exemplary embodiment of a vaginal discharge collection device.
Figure 4:
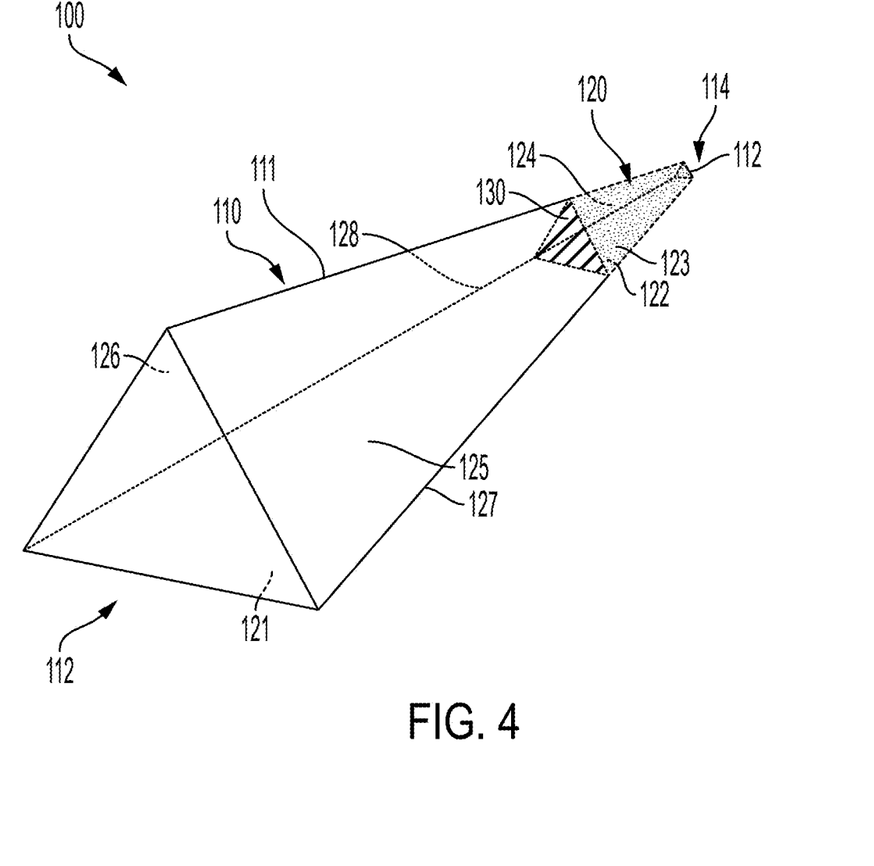
FIG. 4 is a partially transparent schematic perspective view of an exemplary embodiment of a vaginal discharge collection device.

In exemplary embodiments, the main body 110 includes a vertical surface at the front end 112 and/or the rear end 114. A vertical surface may include a surface from 80°-100°, such as 85°-95° relative to the bottom surface 121 of the main body 110. A vertical rear surface can provide stability when a user is laying down on their back, e.g., when wearing the vaginal discharge collection device 100 at night.

Figure 2A:
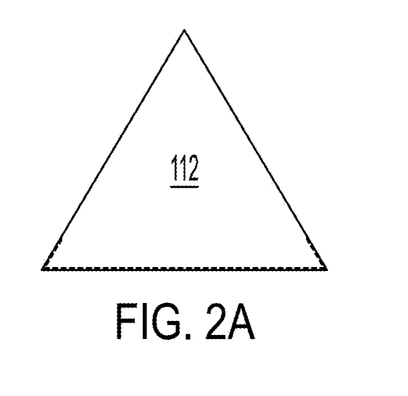
FIG. 2A is a schematic vertical cross section of the front end of an exemplary embodiment of a vaginal discharge collection device.
Figure 2B:
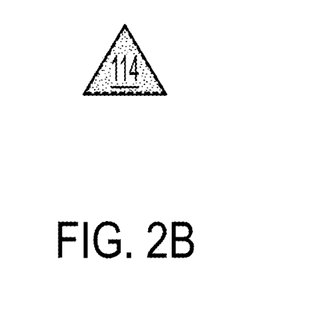
FIG. 2B is a schematic vertical cross section of the rear end of an exemplary embodiment of a vaginal discharge collection device.

In exemplary embodiments, the main body 110 is tapered from the front end 112 to the rear end 114, a first vertical cross section of the front end 112 being larger than a second vertical cross section of the rear end 114. The first and second vertical cross sections may be triangular. Alternatively, the first and second vertical cross sections may have other suitable shapes. It is preferred that the bottom surface 121 of the main body 110 be wider than the top of the main body 110.

In exemplary embodiments, the main body 110 includes a top edge 111 extending from the front end 112 to the rear end 114, and defining a nonzero tapering angle relative to the bottom surface 121 of the main body. The nonzero tapering angle may be, but is not limited to, within the range of 10°-30°, more preferably within the range of 15°-25°, and more preferably about 20°. The top edge 111 may be, but is not limited to, a straight edge from the front end 112 to the rear end 114.

The foregoing features may facilitate positioning of the vaginal discharge collection device 100 between a user's buttocks and/or thighs, e.g., rearward of the perineum of the user. The tapered configuration can improve comfort, as well as vaginal discharge collection effectiveness, by providing a comfortable and tight fit.

In exemplary embodiments, the vaginal discharge collection device 100 comprises an external liquid barrier 120 including a liquid-impermeable material, e.g., to protect clothing, bedding, and/or other body parts such as the user's thighs and/or anal area, from vaginal discharge. Examples of liquid-impermeable materials may include, but are not limited to, waxed paper, latex, polylactic acid (PLA), polyethylene (PE) or polypropylene (PP), thermoplastic polyurethane (TPU) or polyurethane (PU).

In exemplary embodiments, the external liquid barrier 120 includes a bottom liquid barrier 122 and first and second lateral liquid barriers 123, 124. The external liquid barrier 120 may be configured to collect vaginal discharge, and contain such, e.g., during the night, when a user is laying down, to provide user comfort.

In exemplary embodiments, the bottom liquid barrier 122 extends to the rear end 114 across the bottom surface 121 of the main body 110. For example, the bottom liquid barrier 122 may extend from the front end 112 to the rear end 114 across the bottom surface 121 of the main body 110 (as shown for example in FIG. 1). This may promote increased fluid retention in the device 100. Alternatively, the bottom liquid barrier 122 may extend only from the internal liquid barrier 130 (described below) to the rear end 114 across the bottom surface 121 of the main body 110 (as shown for example in FIG. 4). This may promote comfort to the wearer. Alternatively, the bottom liquid barrier 122 may extend across the bottom surface 121 of the main body 110 to various extents.

In exemplary embodiments, the first and second lateral liquid barriers 123, 124 extend to the rear end 114 across at least respective portions of the first and second lateral surfaces 125, 126 of the main body 110. For example, the first and second lateral liquid barriers 123, 124 may extend from the front end 112 to the rear end 114 across at least respective portions of the first and second lateral surfaces 125, 126 of the main body 110 (as shown for example in FIG. 1). This may promote increased fluid retention in the device 100. Alternatively, the first and second lateral liquid barriers 123, 124 may extend only from the internal liquid barrier 130 (described below) to the rear end 114 across portions of the first and second lateral surfaces 125, 126 of the main body 110 (as shown for example in FIG. 4). This may promote comfort to the wearer. Alternatively, the first and second lateral liquid barriers 123, 124 may extend across portions of the first and second lateral surfaces 125, 126 of the main body 110 to various extents.

In exemplary embodiments, the bottom liquid barrier 122 and the first and second lateral liquid barriers 123, 124 continuously form the external liquid barrier 120, to reduce the risk of leakage from the absorbent material of the main body 110.

In exemplary embodiments, the vaginal discharge collection device 100 comprises an internal liquid barrier 130 extending through the main body 110. The internal liquid barrier 130 may extend from the top of the main body 110 to the bottom of the main body 110. The internal liquid barrier 130 may be oriented vertically. In an alternative embodiment, the internal liquid barrier 130 is the only liquid barrier of the vaginal discharge collection device 100.

In exemplary embodiments, the main body 110 may include the absorbent material from the front end 112 of the main body 110 to the internal liquid barrier 130. In exemplary embodiments, the main body 110 may further include the absorbent material from the internal liquid barrier 130 to the rear end 114 of the main body 110.

In exemplary embodiments, the internal liquid barrier 130 may include a liquid-impermeable material. This is to prevent liquid discharge from reaching the rear end 114 of the vaginal discharge collection device 100. This also serves to protect the vaginal area from the anal area.

In exemplary embodiments, the internal liquid barrier 130 may alternatively include a liquid-semi-impermeable material. This is to allow some of the liquid discharge to reach the rear end 114 of the vaginal discharge collection device 100, and thus to more efficiently use the volume of the absorbent material of the main body 110 for liquid collection. Examples of liquid-semi-impermeable materials may include, but are not limited to, microporous films or membranes (e.g., PE, TPU or PU), or semi-permeable nonwovens.

The first lateral surface 125 of the main body 110 includes a first front lateral surface 125F extending from the front end 112 to the internal liquid barrier 130, and a first rear lateral surface 125R extending from the rear end 114 to the internal liquid barrier 130. The second lateral surface 126 of the main body 110 includes a second front lateral surface 126F extending from the front end 112 to the internal liquid barrier 130, and a second rear lateral surface 126R extending from the rear end 114 to the internal liquid barrier 130. In exemplary embodiments, the first lateral liquid barrier 123 partially covers the first front lateral surface 125F and fully covers the first rear lateral surface 125R (see FIG. 3A), and the second lateral liquid barrier 124 partially covers the second front lateral surface 126F and fully covers the second rear lateral surface 126R (see FIG. 3B). This can provide the vaginal discharge collection device 100 with a front section configured for vaginal discharge intake, and a rear section configured for protecting, e.g., clothing, bedding, and/or other body parts such as the user's thighs and/or anal area, from vaginal discharge.

Figure 3A:
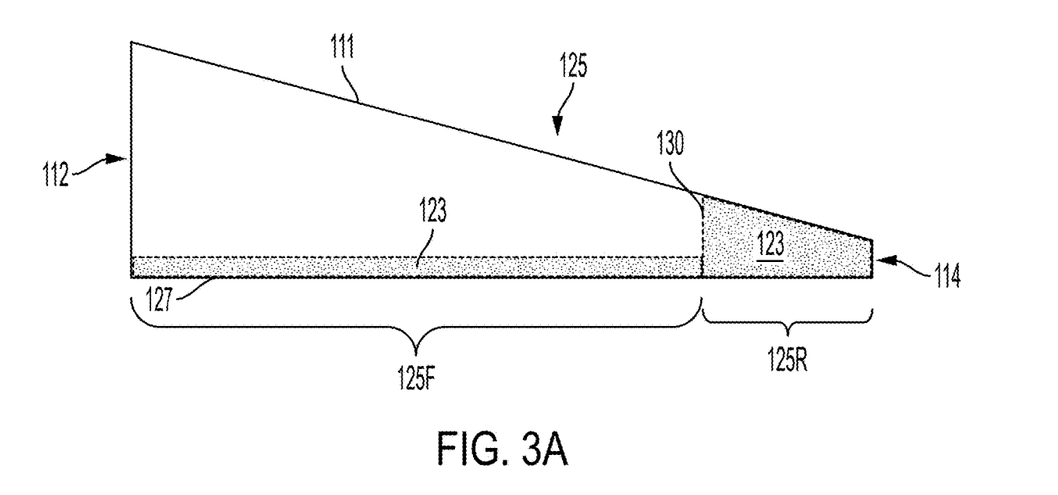
FIG. 3A is a schematic first lateral view of an exemplary embodiment of a vaginal discharge collection device.
Figure 3B:
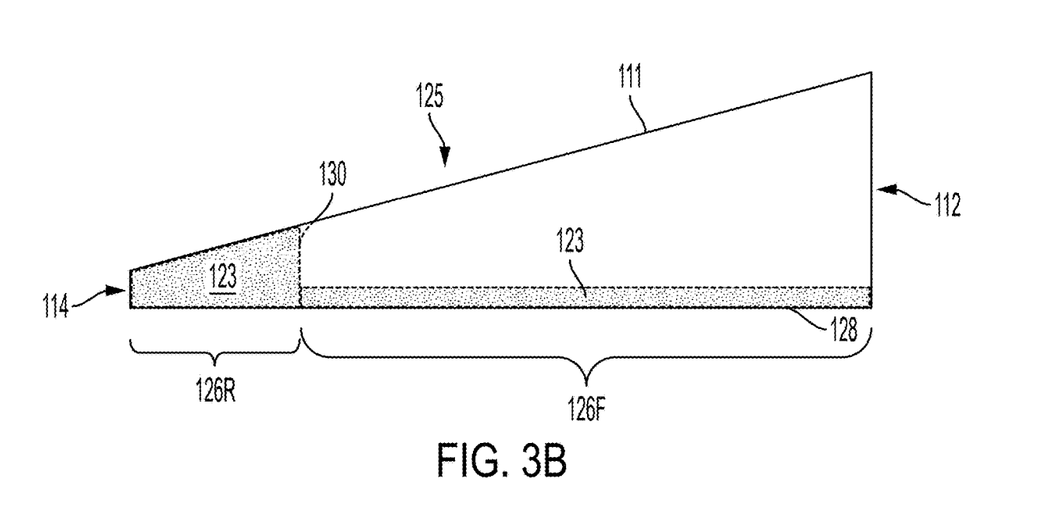
FIG. 3B is a schematic second lateral view of an exemplary embodiment of a vaginal discharge collection device.

In exemplary embodiments, the first and second lateral liquid barriers 123, 124 extend upward from respective first and second outer limits 127, 128 of the bottom surface 121 of the main body, and cover 5% to 50%, or more preferably 10% to 40%, or more preferably 10% to 20% of the first and second front lateral surfaces 125F, 126F of the main body 110, respectively.

In exemplary embodiments, the external liquid barrier 120 includes a rear liquid barrier covering a rear surface at the rear end 114 of the main body 110. The rear liquid barrier may include a liquid-impermeable material. Accordingly, the external liquid barrier 120 may fully enclose the rear end 114 of the main body 110 (i.e., by covering the rear end 114 as well as all sides thereof). This may provide additional leak protection, particularly in embodiments (but not limited to those embodiments) in which the internal liquid barrier 130 is not fully impermeable.

In exemplary embodiments, the front end 112 is free of any liquid barrier to promote collection of vaginal discharge during use. However, the front end 112, and/or any portion of the main body 110 which is not covered by a liquid barrier may be covered by an absorbent sheet, such as a top sheet/surface layer. Examples of materials for such sheets may include, but are not limited to, nonwoven fabrics.

In exemplary embodiments, any liquid-impermeable or liquid-semi-impermeable barrier may additionally be impermeable or semi-impermeable to water vapor, to improve comfort.

In exemplary embodiments, the first vertical cross section is isosceles triangular, with a base measuring about 2 to 5 cm (e.g., about 3 cm), and a height of about 1 to 4 cm (e.g., about 3 cm), and the length from the front end 112 to the rear end 114 is 6 to 10 cm (e.g., about 8 cm). The internal liquid barrier 130 is a vertical barrier placed 0.5 to 3 cm (e.g., about 1 cm) from the rear end 114, and the first and second lateral liquid barriers 123, 124 extend by about 3 to 10 mm (e.g., about 5 mm) upward from the first and second outer limits 127, 128 of the bottom surface 121 of main body 110, along the first and second front lateral surfaces 125F, 126F.

In operation of an exemplary embodiment of the vaginal discharge collection device 100, the vaginal discharge collection device 100 is placed between the buttocks and/or thighs of a user, rearward of a perineum of the user. For example, the vaginal discharge collection device 100 may be placed between the vaginal opening and the anus of the user, to provide collection for fluids when the user is laying on their back, or in other situations in which the vaginal opening is more elevated than the anus (e.g., when sitting, climbing, etc.).

The vaginal discharge collection device 100 may be used as a standalone device, and may thus collect vaginal discharge proximal to the front end 112 of the main body 110.

Alternatively, the vaginal discharge collection device 100 may be used in combination with one or more other hygiene product(s) (e.g., sanitary pad, tampon, menstrual cup, period underwear, etc.). In some exemplary uses, the vaginal discharge collection device 100 may be adhered to another hygiene product, by adhesive, hook-and-loop, or any other suitable method.

Figure 5A:
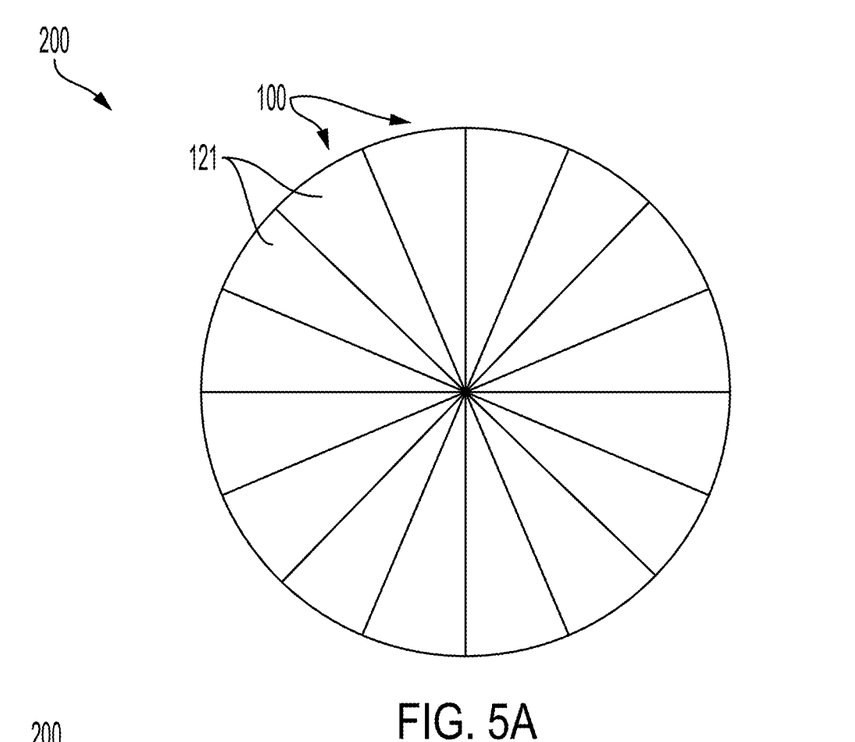
FIG. 5A is a schematic top view of an exemplary embodiment of a packaging assembly of vaginal discharge collection devices.
Figure 5B:
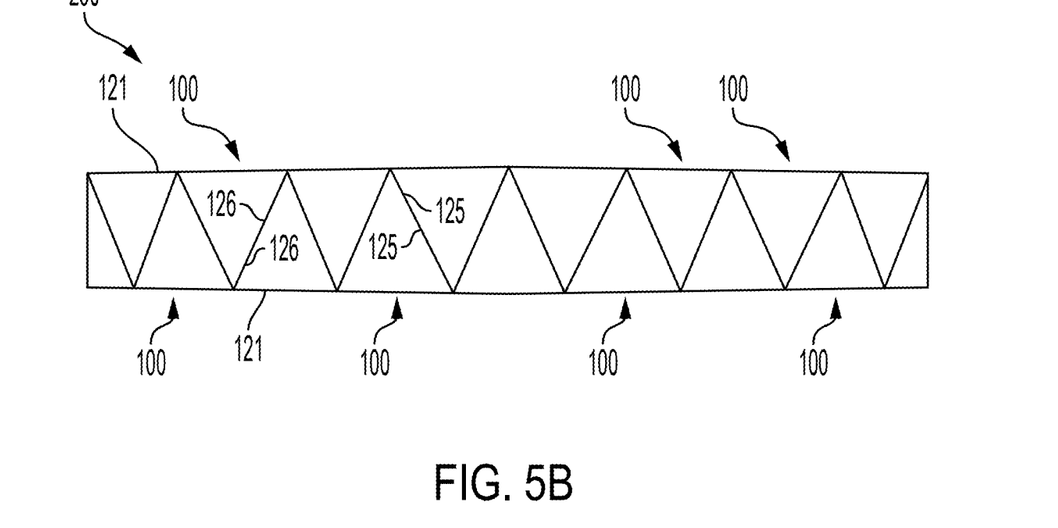
FIG. 5B is a schematic side view of an exemplary embodiment of a packaging assembly of vaginal discharge collection devices.

FIGS. 5A and 5B show an exemplary embodiment of a packaging assembly 200 of vaginal discharge collection devices 100. The vaginal discharge collection devices 100 are disposed in a wheel arrangement around a center axis. Adjacent vaginal discharge collection devices 100 have alternating up-down orientations, to provide storage efficiency.

In exemplary embodiments, lateral surfaces 125, 126 of adjacent vaginal discharge collection devices 100 face each other. For example, lateral surfaces 125, 126 of adjacent vaginal discharge collection devices 100 may contact each other, directly, or indirectly when separated by packaging material.

Exemplary Embodiments

Further aspects of the disclosure are provided below. Aspects of these exemplary embodiments are largely analogous to the exemplary embodiments, examples, etc. as described above, whereby reference is made to the above for a detailed description.

A vaginal discharge collection device comprising:
  a main body 110 including an absorbent material, the main body 110 being tapered from a front end 112 to a rear end 114, a first vertical cross section of the front end 112 being larger than a second vertical cross section of the rear end 114, the main body 110 including first and second lateral surfaces 125, 126, and a bottom surface 121 between the first and second lateral surfaces 125, 126;
  an external liquid barrier 120 including a liquid-impermeable material, the external liquid barrier 120 including a bottom liquid barrier 122 and first and second lateral liquid barriers 123, 124, the bottom liquid barrier 122 extending to the rear end 114 across the bottom surface 121 of the main body 110, and the first and second lateral liquid barriers 123, 124 extending to the rear end 114 across at least respective portions of the first and second lateral surfaces 125, 126 of the main body 110; and
  an internal liquid barrier 130 extending through the main body 110.

Item 2. The vaginal discharge collection device 100 of item 1, wherein the bottom liquid barrier 122 extends from the front end 112 to the rear end 114 across the bottom surface 121 of the main body 110, and the first and second lateral liquid barriers 123, 124 extend from the front end 112 to the rear end 114 across at least respective portions of the first and second lateral surfaces 125, 126 of the main body 110.

Item 3. The vaginal discharge collection device 100 of item 1, wherein the bottom liquid barrier 122 extends only from the internal liquid barrier 130 to the rear end 114 across the bottom surface 121 of the main body 110, and the first and second lateral liquid barriers 123, 124 extend only from the internal liquid barrier 130 to the rear end 114 across at least respective portions of the first and second lateral surfaces 125, 126 of the main body 110.

Item 4. The vaginal discharge collection device 100 of item 1, wherein the first and second vertical cross sections are triangular.

Item 5. The vaginal discharge collection device 100 of item 1, wherein the main body 110 includes a top edge 111 extending front the front end 112 to the rear end 114 and defining a nonzero tapering angle.

Item 6. The vaginal discharge collection device 100 of item 2,
  wherein the first lateral surface 125 of the main body includes a first front lateral surface 125F extending from the front end 112 to the internal liquid barrier 130, and a first rear lateral surface 125R extending from the rear end 114 to the internal liquid barrier 130,
  wherein the first lateral liquid barrier 123 partially covers the first front lateral surface 125F and fully covers the first rear lateral surface 125R,
  wherein the second lateral surface 126 of the main body includes a second front lateral surface 126F extending from the front end 112 to the internal liquid barrier 130, and a second rear lateral surface 126R extending from the rear end 114 to the internal liquid barrier 130, and
  wherein the second lateral liquid barrier 124 partially covers the second front lateral surface 126F and fully covers the second rear lateral surface 126R.

Item 7. The vaginal discharge collection device 100 of item 6, wherein the first and second lateral liquid barriers 123, 124 extend upward from respective first and second outer limits 127, 128 of the bottom surface 121 of the main body 110, and cover 5% to 50% of the first and second front lateral surfaces of the main body 110, respectively.

Item 8. The vaginal discharge collection device 100 of item 6, wherein the first and second lateral liquid barriers 123, 124 extend upward from respective first and second outer limits 127, 128 of the bottom surface 121 of the main body 110, and cover 10% to 40% of the first and second front lateral surfaces of the main body 110, respectively.

Item 9. The vaginal discharge collection device 100 of item 6, wherein the first and second lateral liquid barriers 123, 124 extend upward from respective first and second outer limits 127, 128 of the bottom surface 121 of the main body 110, and cover 10% to 20% of the first and second front lateral surfaces of the main body 110, respectively.

Item 109. The vaginal discharge collection device 100 of item 6, wherein the bottom liquid barrier 122 and the first and second lateral liquid barriers 123, 124 continuously form the external liquid barrier 120.

Item 11. The vaginal discharge collection device 100 of item 1, wherein the internal liquid barrier 130 is oriented vertically.

Item 12. The vaginal discharge collection device 100 of item 1, wherein the internal liquid barrier 130 includes a liquid-impermeable material.

Item 13. The vaginal discharge collection device 100 of item 1, wherein the internal liquid barrier 130 includes a liquid-semi-impermeable material.

Item 14. The vaginal discharge collection device 100 of item 1, wherein the main body 110 includes a vertical front surface at the front end 112.

Item 15. The vaginal discharge collection device 100 of item 1, wherein the main body 110 includes a vertical rear surface at the rear end 114.

Item 16. The vaginal discharge collection device 100 of item 1, wherein the main body 110 includes a rear surface at the rear end 114, wherein the external liquid barrier 120 includes a rear liquid barrier covering the rear surface of the main body 110.

Item 18. The vaginal discharge collection device 100 of item 1, wherein the front end 112 of the main body 110 is free of any liquid barrier.

Item 19. A method of using the vaginal discharge collection device 100 of item 1, including placing the vaginal discharge collection device 100 between the buttocks and/or thighs of a user, rearward of a perineum of the user.

It will be appreciated by those skilled in the art that the disclosure herein can be embodied in other specific forms without departing from the spirit or essential characteristics thereof. The presently disclosed embodiments are therefore considered in all respects to be illustrative and not restricted. The scope of the invention is indicated by the appended claims rather than the foregoing description. All changes coming within the meaning and range and equivalence thereof are intended to be embraced therein.

What is claimed is:

1. A vaginal discharge collection device comprising:
    a main body including an absorbent material, the main body being tapered from a front end to a rear end, a first vertical cross section of the front end being larger than a second vertical cross section of the rear end, the main body including first and second lateral surfaces, and a bottom surface between the first and second lateral surfaces;
    an external liquid barrier including a liquid-impermeable material, the external liquid barrier including a bottom liquid barrier and first and second lateral liquid barriers, the bottom liquid barrier extending to the rear end across the bottom surface of the main body, and the first and second lateral liquid barriers extending to the rear end across at least respective portions of the first and second lateral surfaces of the main body; and
    an internal liquid barrier extending through the main body.

2. The vaginal discharge collection device of claim 1, wherein the bottom liquid barrier extends from the front end to the rear end across the bottom surface of the main body, and the first and second lateral liquid barriers extend from the front end to the rear end across the at least respective portions of the first and second lateral surfaces of the main body.

3. The vaginal discharge collection device of claim 1, wherein the bottom liquid barrier extends only from the internal liquid barrier to the rear end across the bottom surface of the main body, and the first and second lateral liquid barriers extend only from the internal liquid barrier to the rear end across the at least respective portions of the first and second lateral surfaces of the main body.

4. The vaginal discharge collection device of claim 1, wherein the first and second vertical cross sections are triangular.

5. The vaginal discharge collection device of claim 1, wherein the main body includes a top edge extending front the front end to the rear end and defining a nonzero tapering angle.

6. The vaginal discharge collection device of claim 2,
    wherein the first lateral surface of the main body includes a first front lateral surface extending from the front end to the internal liquid barrier, and a first rear lateral surface extending from the rear end to the internal liquid barrier,
    wherein the first lateral liquid barrier partially covers the first front lateral surface and fully covers the first rear lateral surface,
    wherein the second lateral surface of the main body includes a second front lateral surface extending from the front end to the internal liquid barrier, and a second rear lateral surface extending from the rear end to the internal liquid barrier, and
    wherein the second lateral liquid barrier partially covers the second front lateral surface and fully covers the second rear lateral surface.

7. The vaginal discharge collection device of claim 6, wherein the first and second lateral liquid barriers extend upward from respective first and second outer limits of the bottom surface of the main body, and cover 5% to 50% of the first and second front lateral surfaces of the main body, respectively.

8. The vaginal discharge collection device of claim 6, wherein the first and second lateral liquid barriers extend upward from respective first and second outer limits of the bottom surface of the main body, and cover 10% to 40% of the first and second front lateral surfaces of the main body, respectively.

9. The vaginal discharge collection device of claim 6, wherein the first and second lateral liquid barriers extend upward from respective first and second outer limits of the bottom surface of the main body, and cover 10% to 20% of the first and second front lateral surfaces of the main body, respectively.

10. The vaginal discharge collection device of claim 6, wherein the bottom liquid barrier and the first and second lateral liquid barriers continuously form the external liquid barrier.

11. The vaginal discharge collection device of claim 1, wherein the internal liquid barrier is oriented vertically.

12. The vaginal discharge collection device of claim 1, wherein the internal liquid barrier includes a liquid-impermeable material.

13. The vaginal discharge collection device of claim 1, wherein the internal liquid barrier includes a liquid-semi-impermeable material.

14. The vaginal discharge collection device of claim 1, wherein the main body includes a vertical front surface at the front end.

15. The vaginal discharge collection device of claim 1, wherein the main body includes a vertical rear surface at the rear end.

16. The vaginal discharge collection device of claim 1, wherein the main body includes a rear surface at the rear end, wherein the external liquid barrier includes a rear liquid barrier covering the rear surface of the main body.

17. The vaginal discharge collection device of claim 1, wherein the front end of the main body is free of any liquid barrier.

18. A method of using the vaginal discharge collection device of claim 1, including placing the vaginal discharge collection device between the buttocks and/or thighs of a user, rearward of a perineum of the user.

19. A packaging assembly comprising:
- a plurality of vaginal discharge collection devices, each being a vaginal discharge collection device according to claim 1,
- wherein the vaginal discharge collection devices are disposed in a wheel arrangement around a center axis, and
- wherein adjacent vaginal discharge collection devices have alternating up-down orientations.

* * * * *